(12) United States Patent
Suzuki et al.

(10) Patent No.: US 8,932,177 B2
(45) Date of Patent: Jan. 13, 2015

(54) PLANETARY GEAR TRAIN WITH THRUST COLLAR USED AS THRUST BEARING OF PLANETARY GEAR AND WIND TURBINE GENERATOR INCORPORATING THE SAME

(71) Applicants: Mitsubishi Heavy Industries, Ltd., Minato-ku, Tokyo (JP); Ishibashi Manufacturing, Co., Ltd., Nogata, Fukuoka (JP)

(72) Inventors: Kazutaka Suzuki, Tokyo (JP); Kazufumi Takayanagi, Tokyo (JP); Hideaki Nishida, Tokyo (JP); Tadasuke Nishioka, Tokyo (JP); Toshiharu Goya, Nogata (JP)

(73) Assignees: Mitsubishi Heavy Industries, Ltd., Minato-ku, Tokyo (JP); Ishibashi Manufacturing, Co., Ltd., Nogata-shi, Fukuoka (JP)

( * ) Notice: Subject to any disclaimer, the term of this patent is extended or adjusted under 35 U.S.C. 154(b) by 0 days.

(21) Appl. No.: 13/780,048

(22) Filed: Feb. 28, 2013

(65) Prior Publication Data

US 2013/0217535 A1      Aug. 22, 2013

Related U.S. Application Data

(63) Continuation of application No. PCT/JP2010/064762, filed on Aug. 31, 2010.

(51) Int. Cl.
*F16H 57/08* (2006.01)
*F03D 11/02* (2006.01)
(Continued)

(52) U.S. Cl.
CPC ............. *F16H 57/082* (2013.01); *F03D 11/02* (2013.01); *F16C 17/04* (2013.01); *F16C 33/08* (2013.01); *F05B 2260/40311* (2013.01); *Y02E 10/722* (2013.01); *F16C 2360/31* (2013.01)
USPC ........................................... 475/331; 475/346

(58) Field of Classification Search
USPC .................................. 475/346, 331; 384/121
See application file for complete search history.

(56) References Cited

U.S. PATENT DOCUMENTS 1,700,856 A * 2/1929 Schein .......................... 384/368
4,480,492 A * 11/1984 Fujioka et al. ................. 74/467
(Continued)

FOREIGN PATENT DOCUMENTS

JP          S56-30609 U      8/1979
JP          1981-030609 U    3/1981
(Continued)

OTHER PUBLICATIONS

PCT, "International Preliminary Report on Patentability", Mar. 12, 2013.
(Continued)

*Primary Examiner* — Troy Chambers
*Assistant Examiner* — Ryan Dodd
(74) *Attorney, Agent, or Firm* — Benjamin Hauptman; Manabu Kanesaka; Kenneth Berner

(57) ABSTRACT

A planetary gear train is provided with: a carrier; a planetary gear; a planetary pin inserted into an insert hole provided through the planetary gear and coupled to the carrier to rotatably support the planetary gear; a thrust collar attached to a surface opposed to the planetary gear of the carrier so as to surround the planetary pin; and a pin for coupling the thrust collar to the carrier. The thrust collar has a first surface opposed to the carrier and a second surface opposed to the planetary gear, and has a first pin hole provided on the first surface so as not to reach the second surface. The carrier has a second pin hole on a surface opposed to the planetary gear. The thrust collar is attached to the carrier by inserting the pin into the first pin hole of the thrust collar and into the second pin hole of the carrier.

11 Claims, 10 Drawing Sheets

(51) Int. Cl.
*F16C 17/04* (2006.01)
*F16C 33/08* (2006.01)

(56) References Cited

U.S. PATENT DOCUMENTS 5,302,160 A    4/1994  Fujioka
6,459,165 B1 * 10/2002  Schoo ........................ 290/1 C

FOREIGN PATENT DOCUMENTS

| JP | S58-028008 A | 2/1983 | | |
|----|----|----|----|----|
| JP | S59-175715 U | 11/1984 | | |
| JP | 600114320 | * | 8/1985 | ............ F16C 17/06 |
| JP | S60-114320 U | | 8/1985 | |
| JP | 61030722 | * | 2/1986 | ............ F16C 27/00 |
| JP | S61-30722 U | | 2/1986 | |
| JP | S61-133146 U | | 8/1986 | |
| JP | H02-125255 U | | 10/1990 | |
| JP | 1995/010533 U | | 2/1995 | |
| JP | H07-10533 U | | 2/1995 | |
| JP | 2002-221263 A | | 8/2002 | |
| JP | 2002-242999 A | | 8/2002 | |

OTHER PUBLICATIONS

Japan Patent Office, "Decision to Grant a Patent for JP 2012-531596," Apr. 15, 2014.

* cited by examiner

28: THRUST COLLAR
28c 28c
28b: PLANETARY-GEAR-SIDE SURFACE
28a: CARRIER-SIDE SURFACE

PLANETARY GEAR TRAIN WITH THRUST COLLAR USED AS THRUST BEARING OF PLANETARY GEAR AND WIND TURBINE GENERATOR INCORPORATING THE SAME

CROSS-REFERENCE TO RELATED APPLICATION

This application is a continuation of International Application No. PCT/JP2010/064762, filed on Aug. 31, 2010.

BACKGROUND OF THE INVENTION

1. Field of the Invention

The present invention relates to a planetary gear train and a wind turbine generator using the mechanism, more particularly, to a structure of a thrust bearing of the planetary gear.

2. Description of the Related Art

The planetary gear train is one of mechanisms widely used as a step-up gear box and a reduction gear box. The planetary gear train has an advantage that a large reduction ratio can be obtained with a small number of gears and a large torque can be transferred. Such an advantage is preferable for a wind turbine generator, and the planetary gear train is widely used as the step-up gear box of the wind turbine generator.

One problem in applying a planetary gear train to a wind turbine generator is the lifetime of bearings of the planetary gears. When a planetary gear train is used as the gear box of the wind turbine generator, large loads are applied to the bearings of the planetary gears. Currently, rolling bearings are often used as the bearings of the planetary gears in the planetary gear train; however, the lifetime thereof will be reduced when large loads are applied to the rolling bearings. The increase in the load is a serious problem, especially in high-power wind turbine generators which have been recently developed.

The inventors have been considering using sliding bearings as bearings provided on the inner faces of the planetary gears as an approach for achieving a long lifetime and a reduced size of the bearings of the planetary gears. The sliding bearing can sustain the large load, since receiving the load with fluid oil film pressure. The use of sliding bearings, which can sustain a large load, may make it possible to realize a maintenance-free planetary gear train.

The use of a sliding bearing as a bearing of a planetary gear requires thrust bearings to be used in order to maintain a constant axial direction position of the planetary gear. A thrust bearing is typically composed of a circular sliding bearing member attached on the surface opposed to the planetary gear of the carrier. The circular sliding bearing member composing the thrust bearing may be referred to as "thrust collar" or "thrust washer"; hereinafter, the circular sliding bearing member is referred to as "thrust collar". The thrust collar is made of steel (such as S45C and SS400), for example. Japanese Utility Model Application Publication No. JP-U S61-133146 (Patent literature 1) discloses a structure of a thrust bearing having a thrust collar, for example. In addition, Japanese Patent Application Publication JP-A 2002-242999 (Patent literature 2) discloses a structure for realizing the positional restriction in the axial direction of the planetary gear by a circular axial plate provided on the housing.

One issue of the structure of the thrust bearing of the planetary gear is a structure for fixing the thrust collar. An inadequate fixing structure may undesirably cause deterioration of the performance of thrust bearing or generation of a scratch on the sliding surface. For example, a structure for fixing the thrust collar by inserting bolts from the sliding surface requires holes formed on the sliding surface, and these holes undesirably reduce the area of the sliding surface, deteriorating the performance of the thrust bearing; in addition, the holes may cause a scratch formed on the sliding surface. Furthermore, a complicated structure for fixing the thrust collar is unpreferable in terms of productivity and production cost. Japanese Utility Model Application Publication No. JP-U S61-133146 discloses a structure in which openings are formed through the carrier in the direction parallel to the sliding surface and locking clicks provided for the thrust collar are inserted into the openings; however, such structure is undesirably complicated as the structure for fixing the thrust collar.

SUMMARY OF INVENTION

Therefore, an objective of the present invention is to provide a structure attaching a thrust collar for a bearing of a planetary gear of a planetary gear train, which effectively avoids deterioration of the performance of the thrust bearing and generation of a scratch on a sliding surface with simplified configuration.

In an aspect of the present invention, a planetary gear train is provided with: a carrier; a planetary gear; a planetary pin inserted into an insert hole provided through the planetary gear and coupled to the carrier to rotatably support the planetary gear; a thrust collar attached to a surface opposed to the planetary gear of the carrier so as to surround the planetary pin; and a pin for coupling the thrust collar to the carrier. The thrust collar has a first surface opposed to the carrier and a second surface opposed to the planetary gear, and has a first pin hole provided on the first surface so as not to reach the second surface. The carrier has a second pin hole on a surface opposed to the planetary gear. The thrust collar is attached to the carrier by inserting the pin into the first pin hole of the thrust collar and into the second pin hole of the carrier.

It is preferable that the length of a portion of the pin protruding from the carrier is adjustable. In one embodiment, the second pin hole is formed through the carrier, and an internal thread is formed on at least a portion of the hole and an external thread is formed on at least a portion of the pin. The pin and the carrier are coupled with the internal thread and the external thread.

In this case, it is preferable that the planetary gear train further includes a drop-off prevention mechanism for preventing drop-off of the pin from the carrier. In one embodiment, the drop-off prevention mechanism includes a protruding structure inserted into a groove provided in the second pin hole so that the protruding structure protrudes from the second pin hole at a position between the inlet of the second pin hole and the end of the pin. The protruding structure effectively prevents the drop-off of the pin.

It is also preferable that the planetary gear train further includes a loose prevention mechanism for preventing loose of the pin. In one embodiment, the loose prevention mechanism includes an elastic body sandwiched between the external thread and the internal thread. Instead, the external thread may be formed as a spring thread.

It is preferable that the length of the portion of the pin protruding from the carrier is adjusted so as to be larger than the maximum value of the clearance between the planetary gear and the thrust collar.

In another aspect of the present invention, a wind turbine generator is provided with: a wind turbine rotor including a rotor head and a wind turbine blade coupled to the rotor head; a gear box; and a power generator coupled to the output shaft of the gear box. The gear box includes the planetary gear train. The planetary gear train includes: a carrier coupled to the rotor head; a planetary gear; a planetary pin inserted into an insert hole provided through the planetary gear and coupled to the carrier for rotatably supporting the planetary gear; a thrust collar attached to a surface opposed to the planetary gear of the carrier so as to surround the planetary pin; and a pin for coupling the thrust collar to the carrier. The thrust collar has a first surface opposed to the carrier and a second surface opposed to the planetary gear, and has a first pin hole provided on the first surface so as not to reach the second surface. The carrier has a second pin hole on a surface opposed to the planetary gear. The thrust collar is attached to the carrier by inserting the pin into the first pin hole of the thrust collar and into the second pin hole of the carrier.

DESCRIPTION OF PREFERRED EMBODIMENTS

The invention will be now described herein with reference to illustrative embodiments. Those skilled in the art would recognize that many alternative embodiments can be accomplished using the teachings of the present invention and that the invention is not limited to the embodiments illustrated for explanatory purposed.

Figure 1:
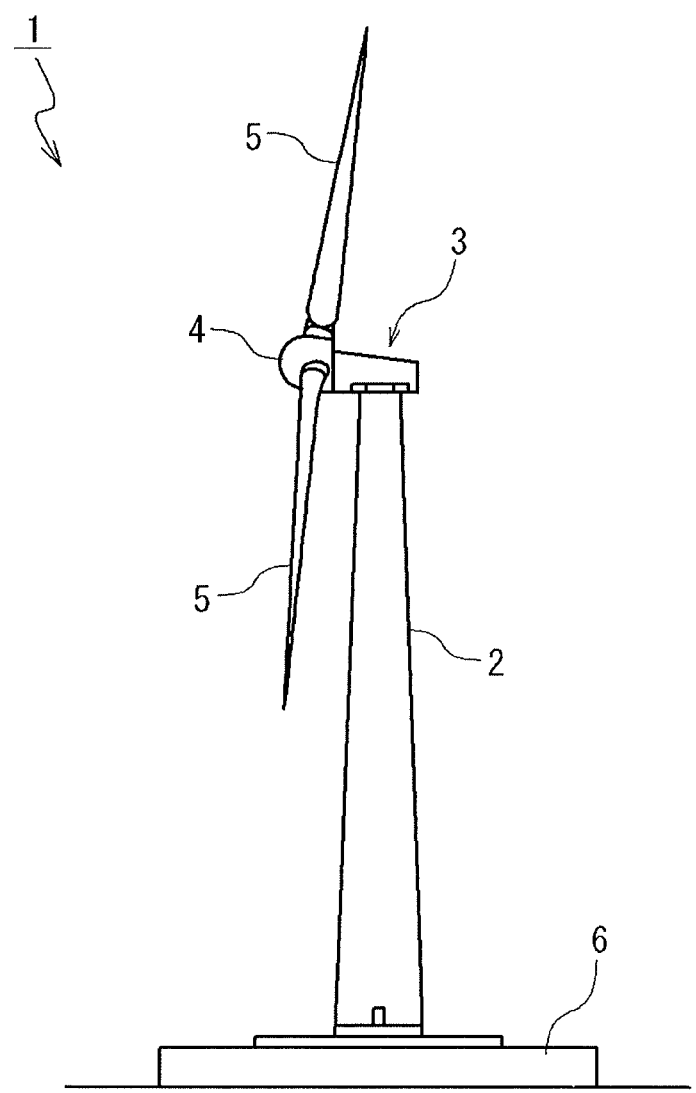
FIG. 1 is an outline view showing the configuration of a wind turbine generator to which a planetary gear train according to one embodiment of the present invention is applied.

FIG. 1 is an outline view showing the configuration of a wind turbine generator utilizing a planetary gear train in one embodiment of the present invention. A wind turbine generator 1 is provided with a tower 2 stood on a base 6, a nacelle 3 installed on an upper end of the tower 2, a rotor head 4 rotatably attached to the nacelle 3, and wind turbine blades 5 attached to the rotor head 4. The rotor head 4 and the wind turbine blades 5 form a wind turbine rotor.

Figure 2:
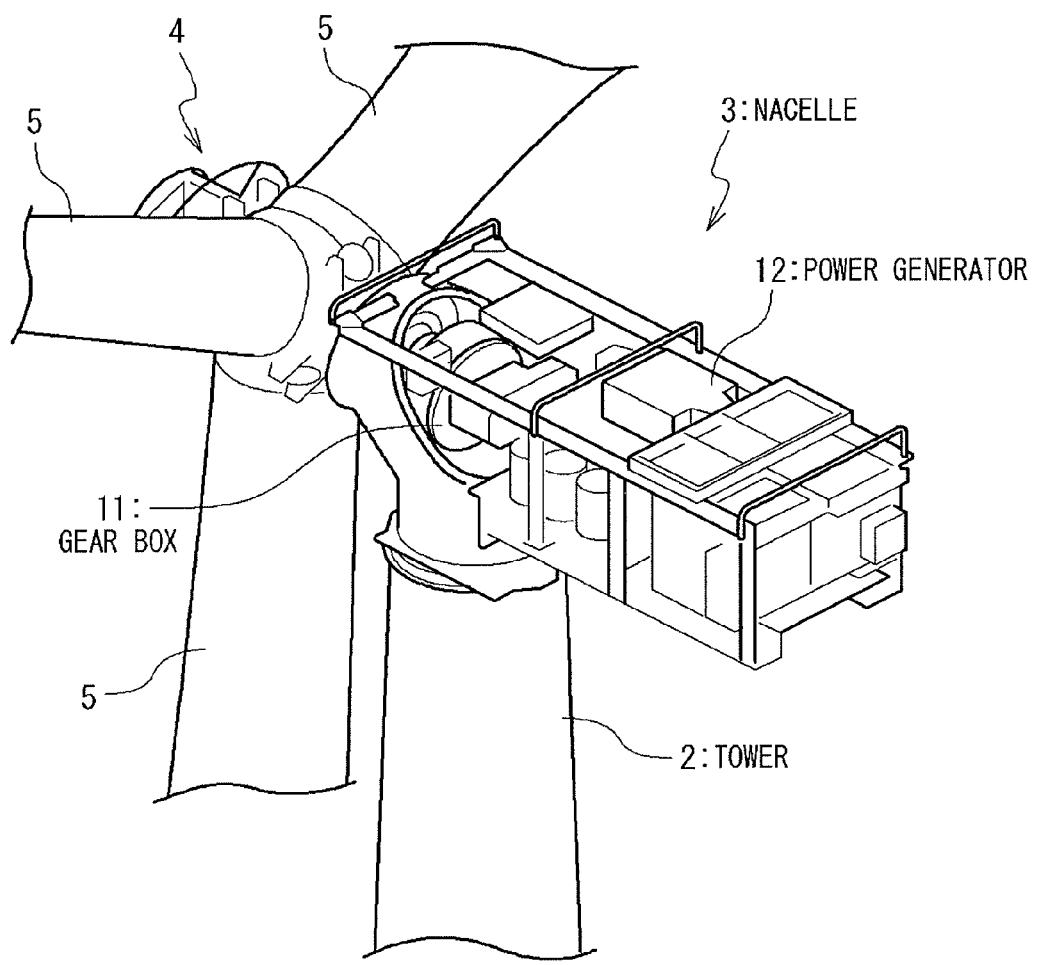
FIG. 2 is a perspective view showing the internal structure of a nacelle in one embodiment of the present invention.

As shown in FIG. 2, a gear box 11 and a power generator 12 are provided inside the nacelle 3. The input shaft of the gear box 11 is coupled to the main shaft (not shown in the drawing) of the rotor head 4, and the output shaft of the gear box 11 is coupled to the rotor of the power generator 12. When the rotor head 4 is rotated by wind power, the rotation thereof is stepped up by the gear box 11 and transferred to the rotor of the power generator 12, so that the power generator 12 is driven. As a result, electric power is obtained from the power generator 12.

Figure 3:
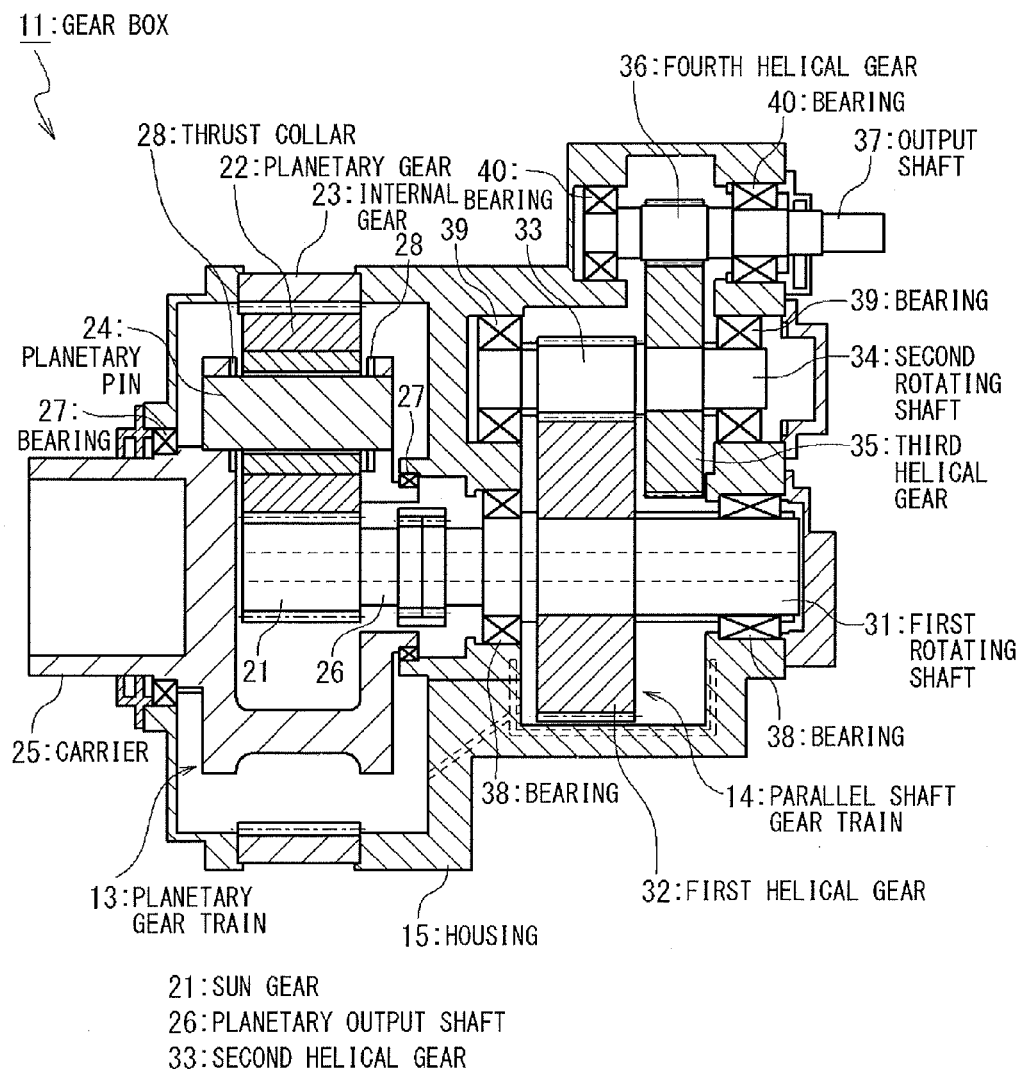
FIG. 3 is a cross sectional view showing the structure of a gear box in one embodiment of the present invention.

FIG. 3 is a cross sectional view showing the configuration of the gear box 11. The gear box 11 includes a planetary gear train 13, a parallel shaft gear train 14, and a housing 15 accommodating the same. The planetary gear train 13 includes a sun gear 21, a plurality of planetary gears 22 (only one shown), an internal gear 23, a plurality of planetary pins 24 (only one shown), a carrier 25, and a planetary output shaft 26. The planetary gears 22 are positioned between the sun gear 21 and the internal gear 23, and supported by the carrier 25 with the planetary pins 24 inserted into the planetary gears 22. As described below, a sliding bearing is provided on the inner surface of the insert hole provided through each planetary gear 22 to allow the planetary gear 22 to rotate with respect to the planetary pin 24. The carrier 25 is rotatably supported by bearings 27 provided on the housing 15, and is used as the input shaft of the planetary gear train 13, that is, the input shaft of the gear box 11. On the other hand, the planetary output shaft 26 is coupled to the sun gear 21 to be used as the output shaft of the planetary gear train 13. When the carrier 25 is rotated, the rotation is transferred to the sun gear 21 via the planetary gears 22, and thus the planetary output shaft 26 connected to the sun gear 21 is rotated at an increased rotation speed.

Thrust collars 28 are attached on the surfaces of the carrier 25 opposed to the planetary gears 22 so as to surround the planetary pins 24; the planetary pins 24 are inserted through the thrust collars 28. Two thrust collars 28 are attached so as to sandwich the planetary gears 22. One feature of the planetary gear train 13 of this embodiment is a structure for attaching the thrust collars 28 to the carrier 25. The structure for attaching the thrust collars 28 to the carrier 25 will be described later.

The parallel shaft gear train 14 includes a first rotating shaft 31 coupled to the planetary output shaft 26, a first helical gear 32 coupled to the first rotating shaft 31, a second helical gear 33, a second rotating shaft 34 coupled to the second helical gear 33, a third helical gear 35 coupled to the second rotating shaft 34, a fourth helical gear 36, and an output shaft 37 coupled to the fourth helical gear 36. The first rotating shaft 31, the second rotating shaft 34, and the output shaft 37 are rotatably supported by bearings 38, 39, and 40 provided on the housing 15, respectively. Moreover, the first helical gear 32 and the second helical gear 33 are engaged with each other, and the third helical gear 35 and the fourth helical gear 36 are engaged with each other. In the parallel shaft gear train 14 having such structure, when the planetary output shaft 26 is rotated, the rotation is transferred to the first helical gear 32, the second helical gear 33, the third helical gear 35, and the fourth helical gear 36, and the output shaft 37 connected to the fourth helical gear 36 is rotated at an increased rotation speed. That is, the gear box 11 provides a step-up of the rotation of the carrier 25 by using the planetary gear train 13 and the parallel shaft gear train 14 when the carrier 25 is rotated, and the resultant rotation is outputted from the output shaft 37.

Figure 4:
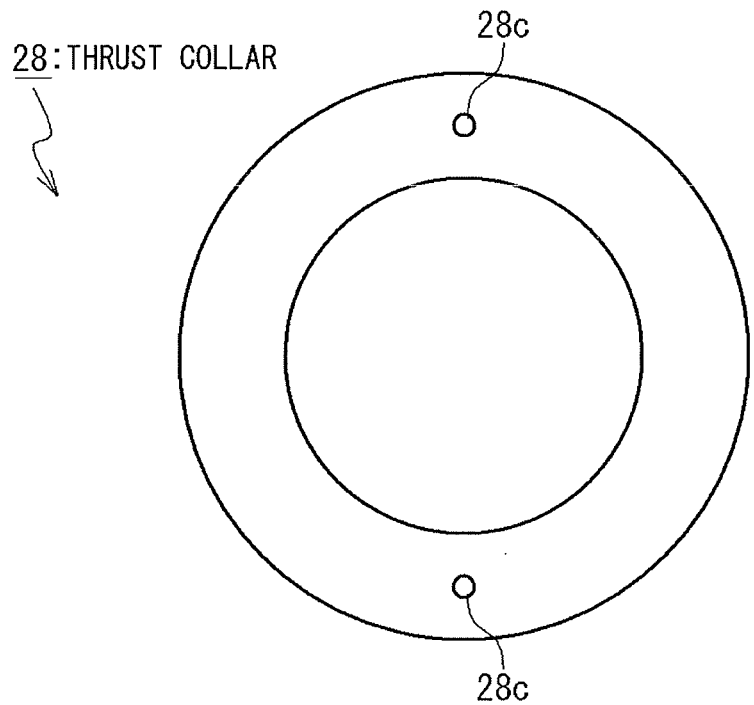
FIG. 4 is a front view showing the structure of a thrust collar of a planetary gear train in one embodiment of the present invention.
Figure 5:
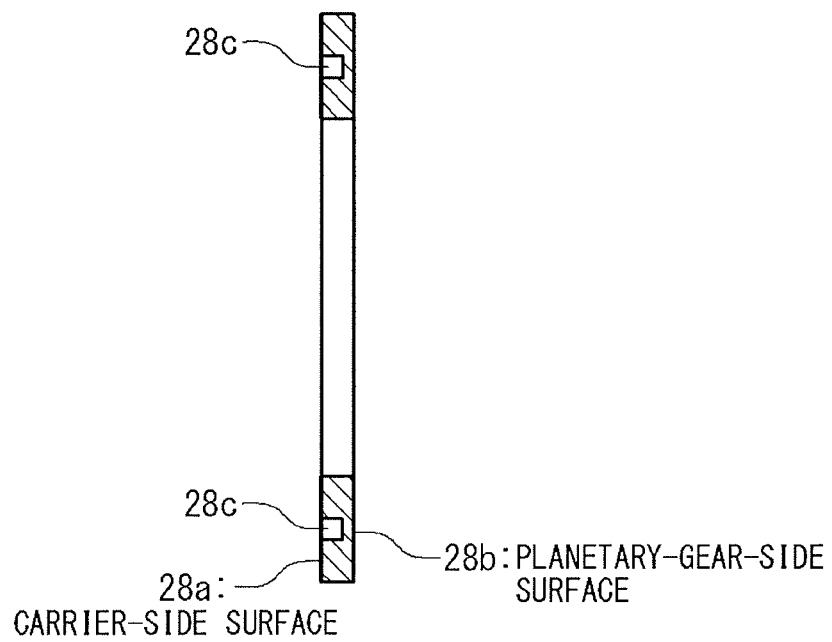
FIG. 5 is a cross sectional view showing the structure of the thrust collar of the planetary gear train in one embodiment of the present invention.
Figure 6:
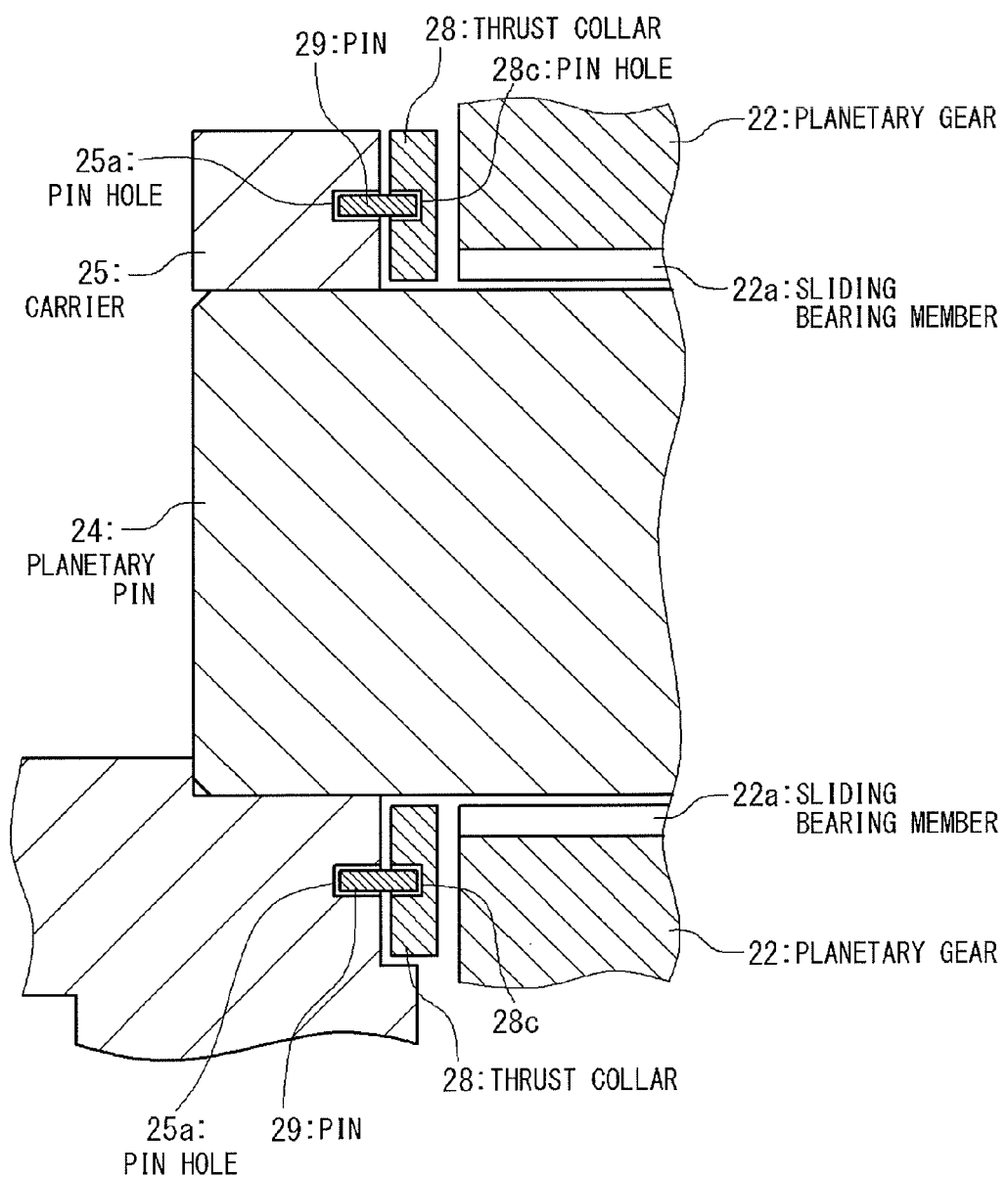
FIG. 6 is a partial cross sectional view showing the attachment structure of the thrust collar in one embodiment of the present invention.

FIGS. 4 to 6 show the structure of the thrust collar 28 and the structure for attaching the thrust collar 28 to the carrier 25 in one embodiment. Referring to FIG. 4, the thrust collar 28 has a ring-shaped structure. Hereinafter, the surface opposed to the carrier 25 of the thrust collar 28 is referred to as carrier-side surface 28a, and the surface opposed to the planetary gear 22 is referred to as planetary-gear-side surface 28b, as illustrated in FIG. 5. The planetary-gear-side surface 28b is a sliding surface that slides with a planetary gear 22.

As shown in FIG. 5, pin holes 28c are provided on the carrier side surface 28a of the thrust collar 28. It should be noted here that the pin holes 28c do not reach the planetary gear side surface 28b.

FIG. 6 is a cross sectional view showing the structure for rotatably supporting a planetary gear 22, especially showing the structure for attaching a thrust collar 28. A sliding bearing member 22a is attached on the inner surface of the insert hole of the planetary gear 22. The planetary gear 22 is rotatably held with the sliding bearing member 22a with respect to the planetary pin 24.

Pin holes 25a are provided for the carrier 25, and in this embodiment, the thrust collar 28 is retained by embedding pins 29 into the pin holes 25a of the carrier 25 and into the pin holes 28a of the thrust collar 28. The pins 29 serve as rotation stoppers for preventing the rotation of the thrust collar 28 when the planetary gear 22 is rotated.

Such structure allows fixing the thrust collar 28 with a simple structure, while avoiding deterioration of the performance of the thrust bearing and generation of damages of the sliding surface. In the attachment structure of the thrust collar 28 of this embodiment, both of the pin holes 25a of the carrier 25 and the pin holes 28a of the thrust collar 28 can be formed in a simple production step, and the pins 29 can be easily attached. On the other hand, deterioration of the performance of the thrust bearing and the generation of damages of the sliding surface can be avoided due to the structure in which the pin holes 28c provided for the thrust collar 28 do not reach the planetary-gear-side surface 28b. If the pin holes 28c reach the planetary-gear-side surface 28b, the area of the sliding surface (that is, the planetary-gear-side surface 28b) is reduced and accordingly the performance of the thrust bearing may be deteriorated. Additionally, in the structure where the pin holes 28c reach the planetary gear side surface 28b, the sliding surface on the side of the planetary gear 22 may be damaged when the pin holes 28c are formed inadequately. On the contrary, such trouble does not occur in this embodiment, since the pin holes 28c do not reach the planetary gear side surface 28b.

It should be noted here that, in order to prevent the drop-off and rotation of the thrust collar 28, it is preferable that the lengths of the portions of the pins 29 protruding from the carrier 25 are adjusted to be larger than the maximum value of the clearance between the planetary gear 22 and the thrust collar 28. The planetary gear 22 is allowed to move in some extent in the axial direction of the planetary pin 24, and accordingly the clearance between the planetary gear 22 and the thrust collar 28 varies. On this occasion, it is preferable that the lengths of the portions of the pins 29 protruding from the carrier 25 are adjusted to be larger than the maximum value of the clearance between the planetary gear 22 and the thrust collar 28 to thereby surely prevent the drop-off and rotation of the thrust collar 28.

Figure 7:
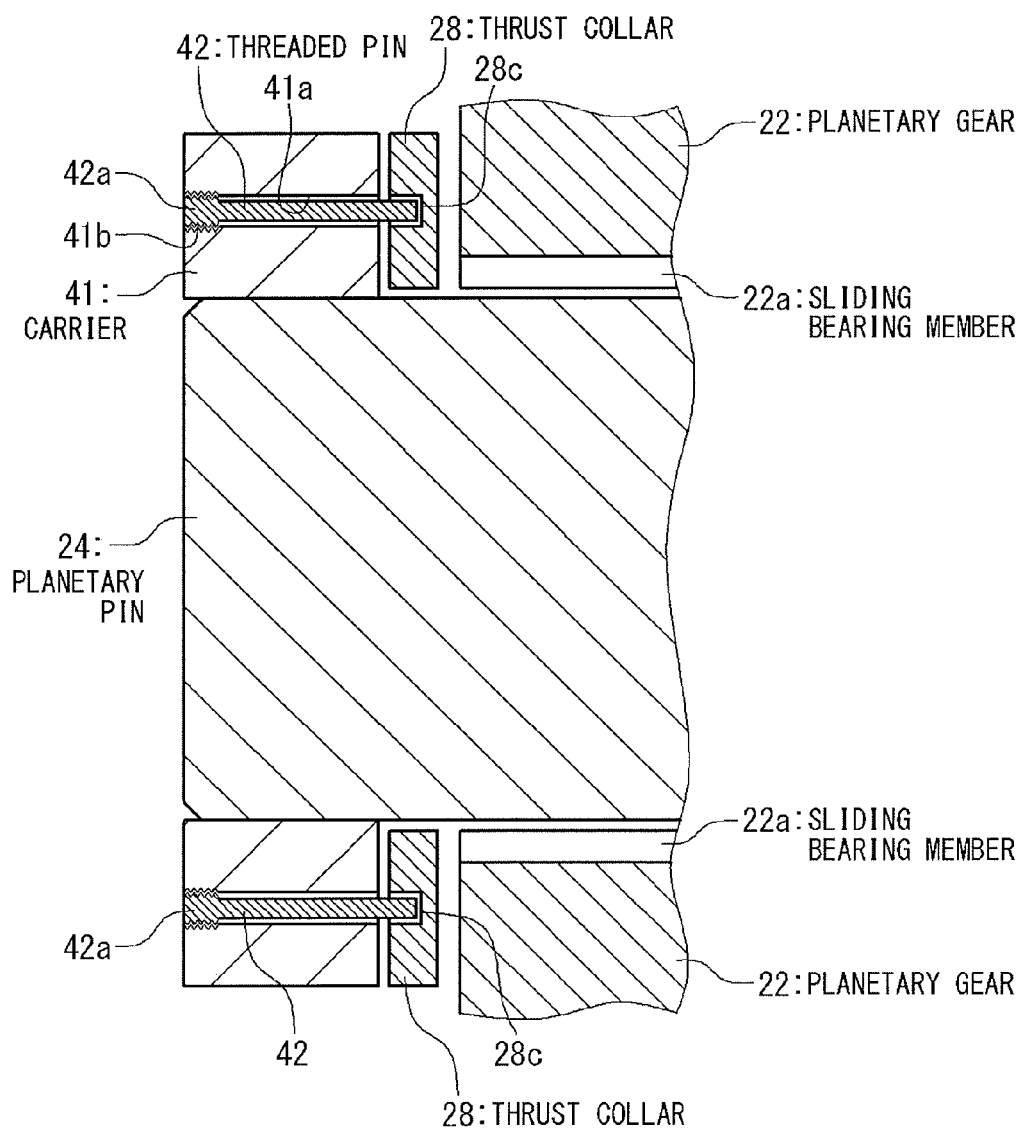
FIG. 7 is a partial cross sectional view showing the attachment structure of a thrust collar in another embodiment of the present invention.

In order to facilitate the adjustment of the clearance between the planetary gear 22 and the thrust collar 28, it is preferable that the lengths of the portions of the pins 29 protruding from the carrier 25 are adjustable. FIG. 7 is a cross sectional view showing an example of the structure which allows adjusting the lengths of the portions of the pins 29 protruding from the carrier 25. In the structure shown in FIG. 7, pin holes 41a reaching the surface opposed to the thrust collar 28 is formed through the carrier 41. An internal thread 41b is formed in a part of each pin hole 41a. In the structure in FIG. 7, the internal threads 41b are provided in the vicinity of the inlet of the pin holes 41a. A threaded pin 42 is inserted into each pin hole 41a. An external thread 42a is formed on a head portion of each threaded pin 42. The threaded pins 42 and the carrier 41 are coupled by engaging the external threads 42a of the threaded pins 42 with the internal threads 41b of the carrier 41. Moreover, the thrust collar 28 is retained by inserting the tip of the threaded pins 42 into the pin holes 28c of the thrust collar 28.

In the structure in FIG. 7, the threaded pins 42 serve as rotation stoppers for preventing the rotation of the thrust collar 28 when the planetary gear 22 is rotated. Additionally, in the structure in FIG. 7, the lengths of the portions of the threaded pins 42 protruding from the carrier 41 can be easily adjusted by rotating the threaded pins 42.

Figure 8A:
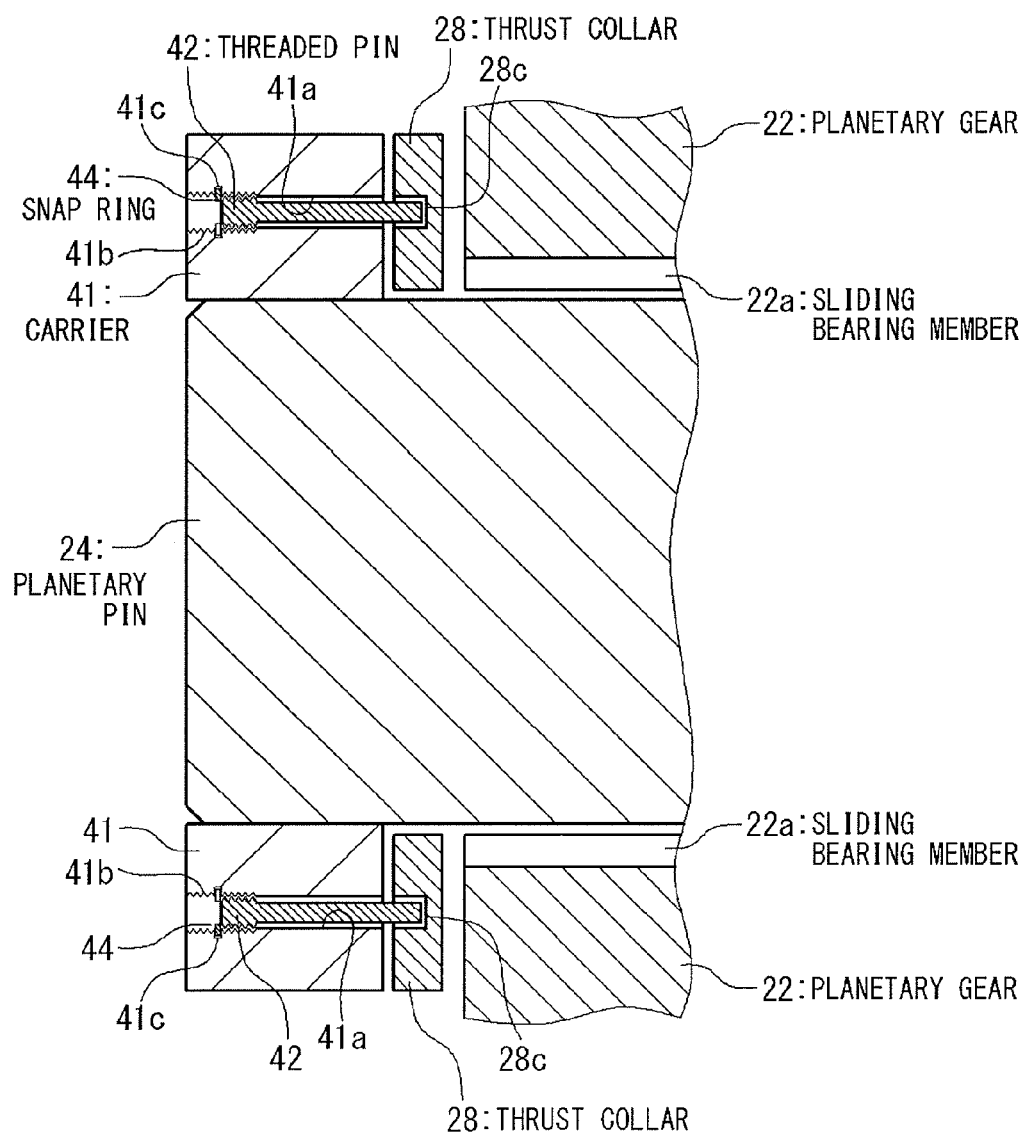
FIG. 8A is a partial cross sectional view showing the attachment structure of a thrust collar in still another embodiment of the present invention.
Figure 8B:
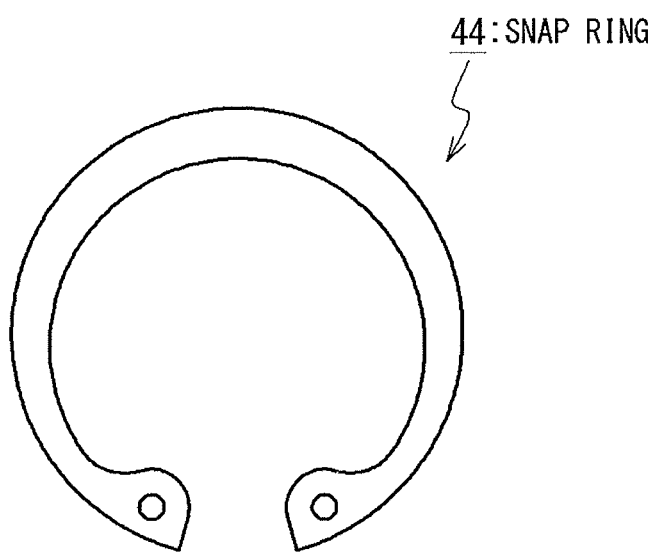
FIG. 8B is a plane view showing the structure of a snap ring used in the attachment structure of the thrust collar of FIG. 8A.

It is not preferable in the structure in FIG. 7 that the threaded pins 42 are loosed or dropped off. Accordingly, it is preferable that a loose prevention mechanism for preventing the loose of the threaded pins 42 or a drop-off prevention mechanism for preventing the drop-off is provided for the planetary gear train 13. In one embodiment, as shown in FIG. 8A, a snap ring 44 is provided for preventing the drop-off of each threaded pin 42. The snap ring 44 is inserted into a groove 41c provided in the vicinity of the inlet of each pin hole 41a of the carrier 41. The snap rings 44 are formed of elastically-deformable material (for example, spring steel or stainless spring steel), and have a ring shaped structure with a part cut out as shown in FIG. 8B. It should be noted that the structure of the snap rings 44 may be variously modified, and is not limited to the structure shown in FIG. 8B.

Referring back to FIG. 8A, a snap ring 44 is attached in the following procedure: After a threaded pin 42 are inserted, the snap ring 44 is inserted to the position corresponding to a groove 41c of a pin hole 41a in a state in which the outer diameter thereof is shrunk. Subsequently, the outer diameter of the snap ring 44 is expanded with the elasticity thereof to thereby attach the snap ring 44 to the groove 41c. The snap ring 44 protrudes from the pin hole 41a inward in the radial direction when the snap ring 44 is attached to the groove 41c. The snap ring 44 is attached at a position between the head portion of the threaded pin 42 and the inlet of the pin hole 41a, and prevents the drop-off of the threaded pin 42 from the carrier 41 in a case that the threaded pin 42 is loosed.

Figure 9:
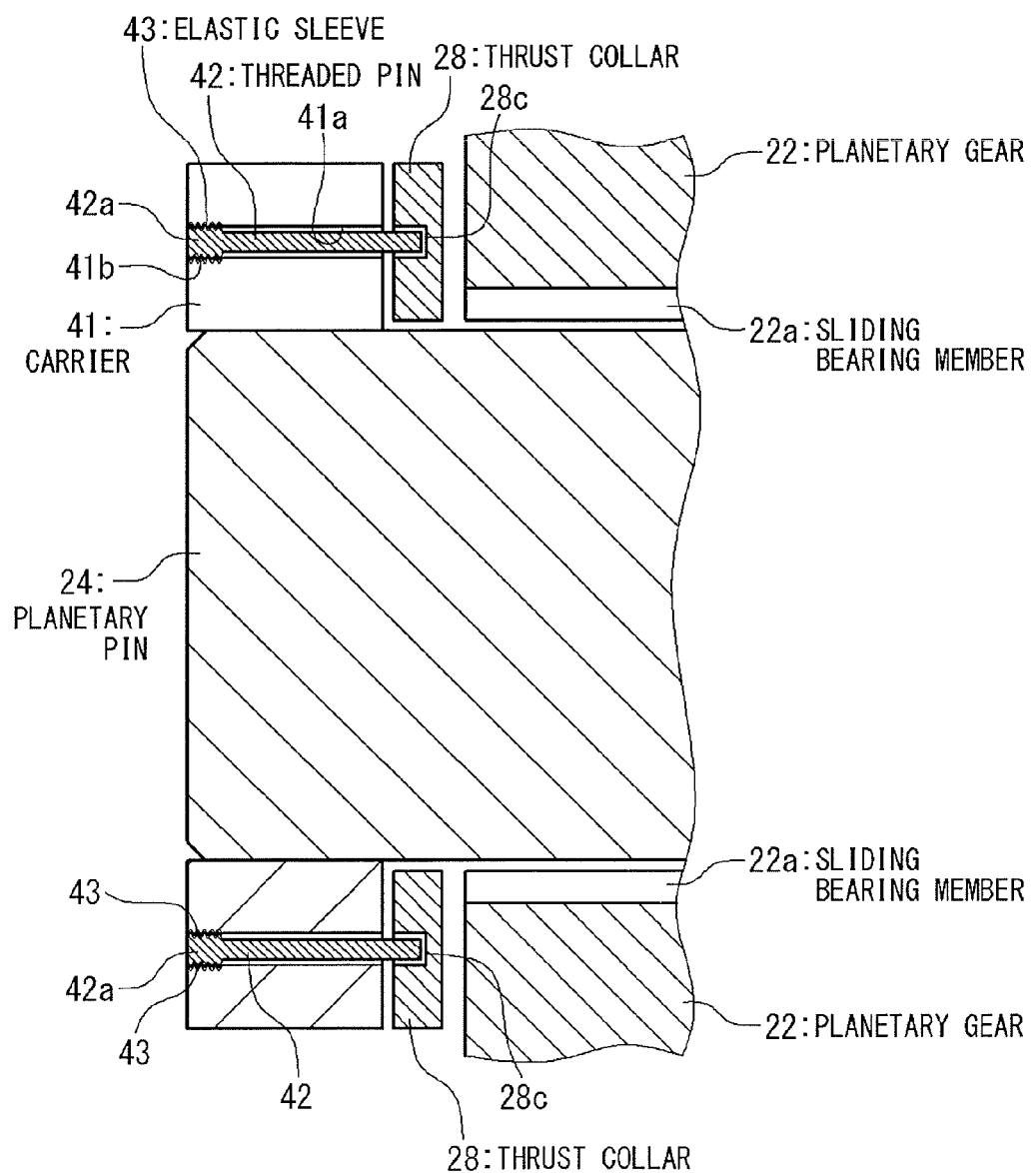
FIG. 9 is a partial cross sectional view showing the attachment structure of a thrust collar in still another embodiment of the present invention.

In an alternative embodiment, as shown in FIG. 9, elastic members are sandwiched between the external threads 42a of the threaded pins 42 and the internal threads 41b of the carrier 41. The elastic members are filled between the external thread 42a and the internal thread 41b, and in one embodiment, elastic sleeves 43 are sandwiched between the external threads 42a and the internal threads 41b. The elastic sleeves 43 are formed of rubber, for example. The elastic sleeves 43 may be formed by winding resin tapes (for example, sealing tapes which are widely used for the sealing of pipes) around the external threads 42a of the threaded pins 42.

Figure 10:
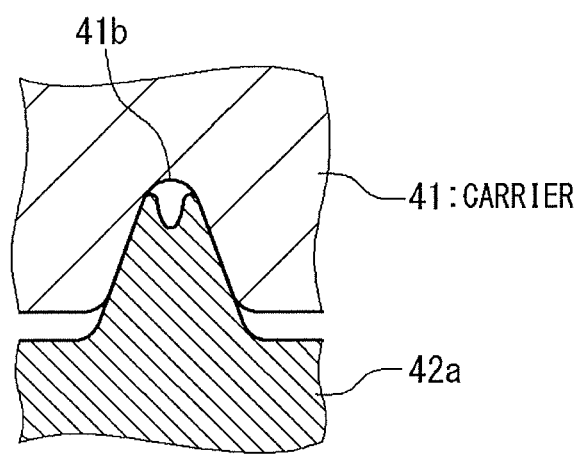
FIG. 10 is a partial cross sectional view showing the structure of a spring thread preferably used in the attachment structure of the thrust collar.

In still another embodiment, spring threads are used as the external threads 42a of the threaded pin 42. In a spring thread, as illustrated in FIG. 10, a spiral-shaped groove is provided in the vicinity of the top of the screw thread to allow the thread to be elastically deformed. When the threaded pins 42 using the spring threads are tightened up, the clearance between the external thread 42a and the internal thread 41b of the carrier 41 is eliminated due to the elasticity of the external threads 42a. This effectively avoids the loose of the threaded pins 42.

It should be noted that, although the embodiments of the present invention are specifically described in the above description, the present invention may be implemented with various modifications which are obvious to the person skilled in the art. For example, although the thrust collar 28 is retained with two pins 29 in the structure illustrated in FIGS. 4 to 6, the number of pins 29 may be arbitrarily changed. The number of the pin holes 25a of the carrier 25 and the number of pin holes 28c of the thrust color 28 are increased or reduced depending on the number of the pins 29. In addition, although the embodiments in which the planetary gear train is applied to the gear box 11 of the wind turbine generator 1 are described in the above, the planetary gear train of the present invention may be preferably applied also to other power machineries in which a large load is applied to the planetary gear.

It is apparent that the present invention is not limited to the above-described embodiments, which may be modified and changed without departing from the scope of the invention.

What is claimed is:

1. A planetary gear train, comprising:
   a carrier;
   a planetary gear;
   a planetary pin inserted into an insert hole provided through said planetary gear and coupled to said carrier to rotatably support said planetary gear;
   a thrust collar attached to a surface opposed to said planetary gear of said carrier so as to surround said planetary pin; and
   a pin for coupling said thrust collar to said carrier,
   wherein said thrust collar has a first surface opposed to said carrier and a second surface opposed to said planetary gear, and has a first pin hole provided on said first surface so as not to reach said second surface,
   wherein said carrier has a second pin hole on a surface opposed to the planetary gear,
   wherein said thrust collar is attached to said carrier by inserting said pin into said first pin hole of said thrust collar and into said second pin hole of said carrier
   wherein said second pin hole is formed through said carrier,
   wherein an internal thread is formed on only a portion of the second pin hole,
   wherein an external thread is formed on only a portion of the pin, and
   wherein said pin and the carrier are coupled with the internal thread and the external thread.

2. The planetary gear train according to claim 1, further comprising a drop-off prevention mechanism for preventing drop-off of said pin from said carrier.

3. The planetary gear train according to claim 2, wherein said drop-off prevention mechanism includes a protruding structure inserted into a groove provided in said second pin hole,
   wherein said protruding structure protrudes from said second pin hole at a position between the inlet of the second pin hole and the end of the pin so as to prevent the drop-off of said pin.

4. The planetary gear train according to claim 1, further comprising a loose prevention mechanism for preventing loose of said pin.

5. The planetary gear train according to claim 4, wherein said loose prevention mechanism includes an elastic body sandwiched between said external thread and said internal thread.

6. The planetary gear train according to claim 4, wherein said external thread is formed as a spring thread.

7. The planetary gear train according to claim 1, wherein a length of a portion of said pin protruding from said carrier is adjusted so as to be larger than the maximum value of a clearance between said planetary gear and said thrust collar.

8. A wind turbine generator, comprising:
   a wind turbine rotor including a rotor head and a wind turbine blade coupled to the rotor head;
   a gear box; and
   a power generator coupled to an output shaft of the gear box,
   wherein said gear box includes a planetary gear train,
   wherein said planetary gear train includes:
      a carrier coupled to the rotor head;
      a planetary gear;
      a planetary pin inserted into an insert hole provided through said planetary gear and coupled to said carrier to rotatably support said planetary gear;
      a thrust collar attached to a surface opposed to said planetary gear of said carrier so as to surround said planetary pin; and
      a pin for coupling said thrust collar to said carrier,
   wherein said thrust collar has a first surface opposed to said carrier and a second surface opposed to said planetary gear, and has a first pin hole provided on said first surface so as not to reach said second surface,
   wherein said carrier has a second pin hole on a surface opposed to said planetary gear,
   wherein said thrust collar is attached to said carrier by inserting said pin into said first pin hole of said thrust collar and into said second pin hole of said carrier,
   wherein said second pin hole is formed through said carrier,
   wherein an internal thread is formed on only a portion of the second pin hole,
   wherein an external thread is formed on only a portion of the pin, and
   wherein said pin and the carrier are coupled with the internal thread and the external thread.

9. The wind turbine generator according to claim 8, wherein a length of a portion of said pin protruding from said carrier is adjusted so as to be larger than the maximum value of a clearance between said planetary gear and said thrust collar.

10. The planetary gear train according to claim 1, wherein the internal thread and the external thread are present at an end of the carrier, on a side opposite to the first surface.

11. The wind turbine generator according to claim 8, wherein the internal thread and the external thread are present at an end of the carrier, on a side opposite to the first surface.

* * * * *